United States Patent [19]

Fisher et al.

[11] Patent Number: 4,818,170

[45] Date of Patent: Apr. 4, 1989

[54] DRIVEWAY TRUCK RESTRAINING APPARATUS

[75] Inventors: Patrick W. Fisher, Milwaukee; James P. Hagen, Jr., Hartland, both of Wis.

[73] Assignee: Nova Technologies, Inc, Hartford, Wis.

[21] Appl. No.: 17,987

[22] Filed: Feb. 24, 1987

[51] Int. Cl.⁴ .............................................. B65G 67/02
[52] U.S. Cl. ..................................................... 414/401
[58] Field of Search ................................. 414/401, 584

[56] References Cited

U.S. PATENT DOCUMENTS

| | | | |
|---|---|---|---|
| 2,637,454 | 5/1953 | Rowe | 414/584 |
| 4,127,856 | 11/1978 | Bickel | 414/401 X |
| 4,267,748 | 5/1981 | Grunewald et al. | 414/401 X |
| 4,488,325 | 12/1984 | Bennett et al. | 414/401 X |
| 4,555,211 | 11/1985 | Metz | 414/401 |
| 4,589,813 | 5/1986 | Hagen et al. | 414/401 |
| 4,664,582 | 5/1987 | Edmeads | 414/401 |
| 4,695,216 | 9/1987 | Erlandsson | 414/401 |
| 4,735,542 | 4/1988 | Fisher et al. | 414/401 |
| 4,759,678 | 7/1988 | Hageman | 414/401 |
| 4,767,254 | 8/1988 | Kovach et al. | 414/401 |

Primary Examiner—Robert J. Spar
Assistant Examiner—Robert S. Katz
Attorney, Agent, or Firm—Ronald E. Barry

[57] ABSTRACT

A driveway truck restraining apparatus including a sealed casing embedded partially in the ground, a ram mounted in the casing for movement between a storage position and an operative position blocking the travel of the ICC bar located on the back of a truck, a pneumatic piston and cylinder assembly mounted on the loading dock and being operatively connected to the ram, and an indoor signal assembly mounted on the inside of the loading dock and an outdoor signal assembly mounted on the outside of the loading dock, the signal assemblies being electrically connected to the piston and cylinder assembly to provide control signals indicating the position of the ram and the absence or presence of a truck at the loading dock.

7 Claims, 3 Drawing Sheets

DRIVEWAY TRUCK RESTRAINING APPARATUS

BACKGROUND OF THE INVENTION

Truck restraining devices of the type contemplated herein are shown in our application entitled "Truck Restraint" U.S. application Ser. No. 860,644, filed on May 7, 1986 assigned to the same assignee, now U.S. Pat. No. 4,735,542. This type of restraint is mounted in the ground in the driveway in front of a loading dock and requires no further anchoring. The restraint has a low profile so that it is adaptable to any size truck presently operating on the highway.

SUMMARY OF THE INVENTION

The truck restraining apparatus, according to the present invention, includes a number of improvements in our earlier restraint which enhances the operation of the restraining apparatus. A light system has been provided which makes it possible for the operator to operate the restraining apparatus without opening the door in the loading dock. This has been accomplished by providing an indication of the presence of a truck at a particular loading dock. The restraining apparatus can then be activated to raise the ram. The housing for the ram in the restraint assembly has been sealed so that it can be filled with antifreeze for use in cold weather. The operating mechanism has been automated to provide a visual indication of the position of the ram due to the physical location of the operating handle for the operating mechanism.

IN THE DRAWINGS

DESCRIPTION OF THE INVENTION

Figure 1:
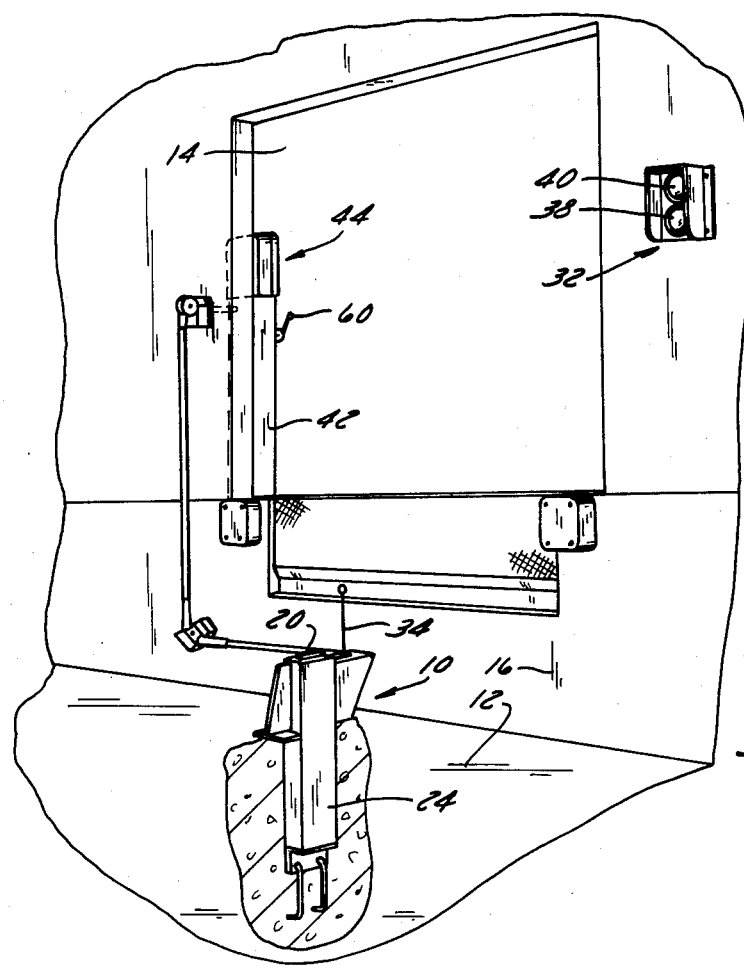
FIG. 1 is a perspective view of the truck restraining apparatus located in the front of a dock and partly broken away to show the anchoring system in the driveway.
Figure 2:
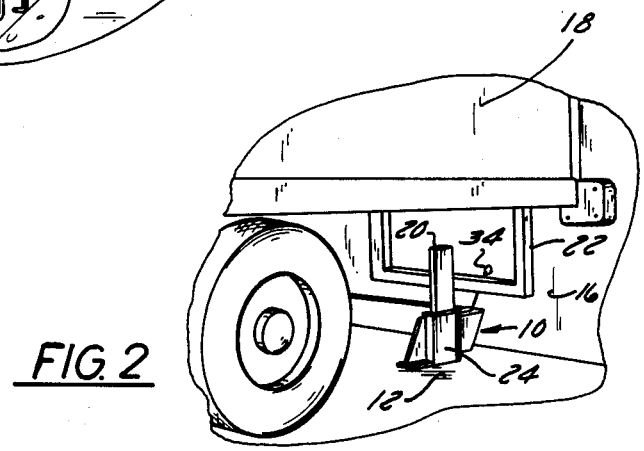
FIG. 2 is a perspective view of the rear portion of a truck shown blocked by the restraining apparatus in front of the loading dock.
Figure 3:
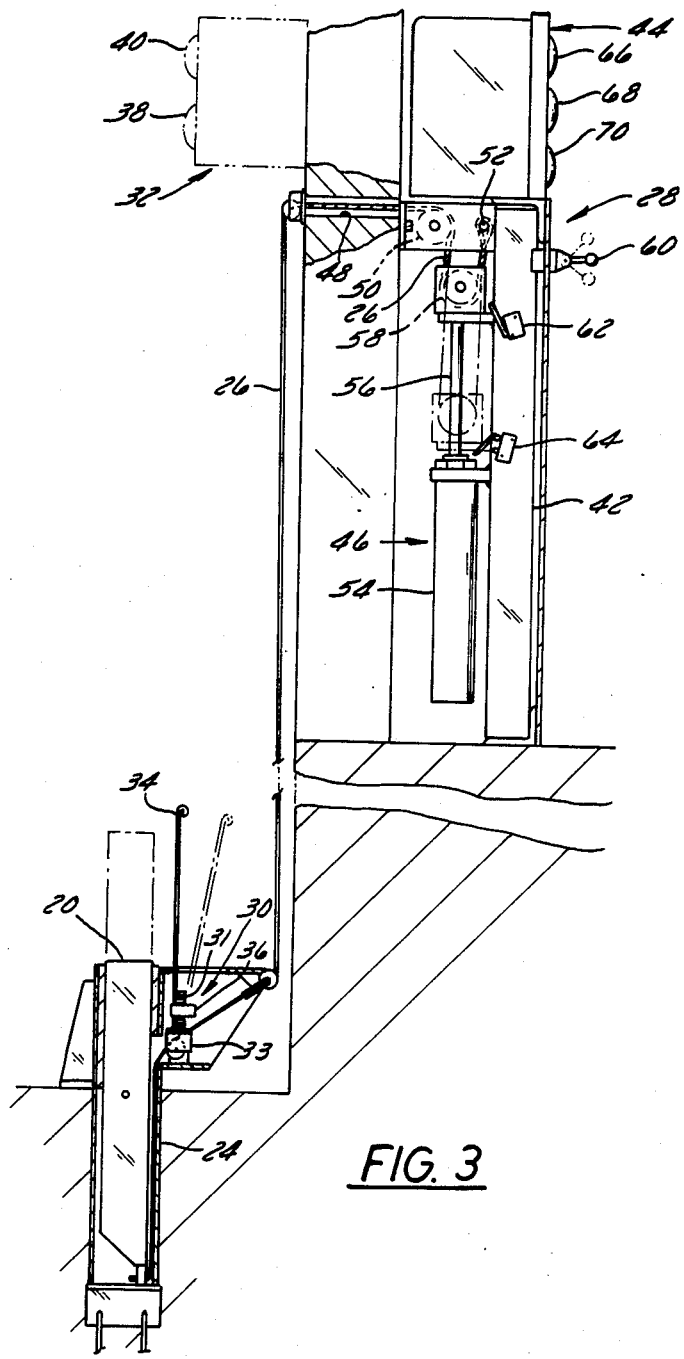
FIG. 3 is a side elevation view of the dock broken away to show the relation between the operating mechanism and the casing and ram for the apparatus.

The truck restraining apparatus 10 as seen in FIGS. 1 and 2 is shown embedded in a driveway 12 in a spaced relation to a door 14 in a loading dock 16. In FIG. 1, the ram 20 for the restraining apparatus is shown in the storage position in the casing 24. In FIG. 2, a truck 18 is shown positioned in front of the dockboard 16 with the ram 20 in the extended or operative position in the casing 24 with the ICC bar 22 located between the ram and the loading dock.

The truck restraining apparatus 10 is generally described in our copending application, Ser. No. 860,644, (now U.S. Pat. No. 4,735,542), and includes a ram 20 mounted for reciprocal movement within the casing 24. The ram 20 is moved between the storage and extended positions by means of a cable 26 operatively connected to an operating mechanism 28 located on the inside of the wall of the loading dock. The structure of the casing 24 and ram 20 is substantially identical to the restraining apparatus shown and described in our copending application, with the exception that casing 24 is sealed to enclose the ram 20. This allows the casing 24 to be filled with antifreeze to prevent freeze-up of the ram 20 in the casing 24 in cold weather.

The operating mechanism 28 includes post 42 and an inside light assembly 44 mounted on top of the post 42. The light assembly 44 including a red light 66, a green light 68, and a blue light 70. Means in the form of a pneumatic piston and cylinder assembly 46 is supported on the post 42 and is operatively positioned to engage the cable 26.

In this regard, it should be noted that the cable 26 extends through an opening 48 in the wall, passes over a pulley 50 and is attached to a fixed pin 52. The piston and cylinder assembly 46 includes a cylinder 54 and a piston rod 56. A pulley 58 is mounted on the end of the piston rod 56 with the cable 26 reeved around the pulley 58 in the space between the pulley 50 and the pin 52. The ram 20 is moved up to the locked position by moving the piston 56 down into the cylinder 54 and moves down when the piston 56 is moved up in cylinder 54.

The piston cylinder assembly 46 is operated by means of a handle 60 mounted on the upper end of the post 42. The handle 60 is operatively connected to open and close an air line (not shown) connected to the cylinder 54 for moving the piston up and down in the cylinder. Means are provided for sensing the position of the piston 56 with respect to the cylinder. Such means is in the form of a first limit switch 62 which indicates the position of the piston 56 when the piston is up and a second limit switch 64 which senses the position of the piston when the piston is down.

A truck sensing means in the form of a switch assembly 30 is mounted on the casing 24 in the path of motion of the ICC bar on the truck. The switch assembly includes a mount 33, a coil spring 31 and a wand 34 mounted on the coil spring. A mercury switch 36 is mounted on the spring 31. The mercury switch 36 moves with the spring 31 between open and closed positions as described hereinafter.

Means are provided on the outside of the wall of the loading dock to indicate to the driver that the truck is located in the loading dock and locked to the dock to prevent the truck from moving away from the loading dock. Such means is in the form of an outside light assembly 32 mounted on the outside of the wall of the loading dock. The light assembly 32, as more particularly described hereinafter, includes a green light 38 and a red light 40. When the green light is flashing, the driver can move the truck. When the red light is flashing, the driver should not move the truck.

Figure 5:
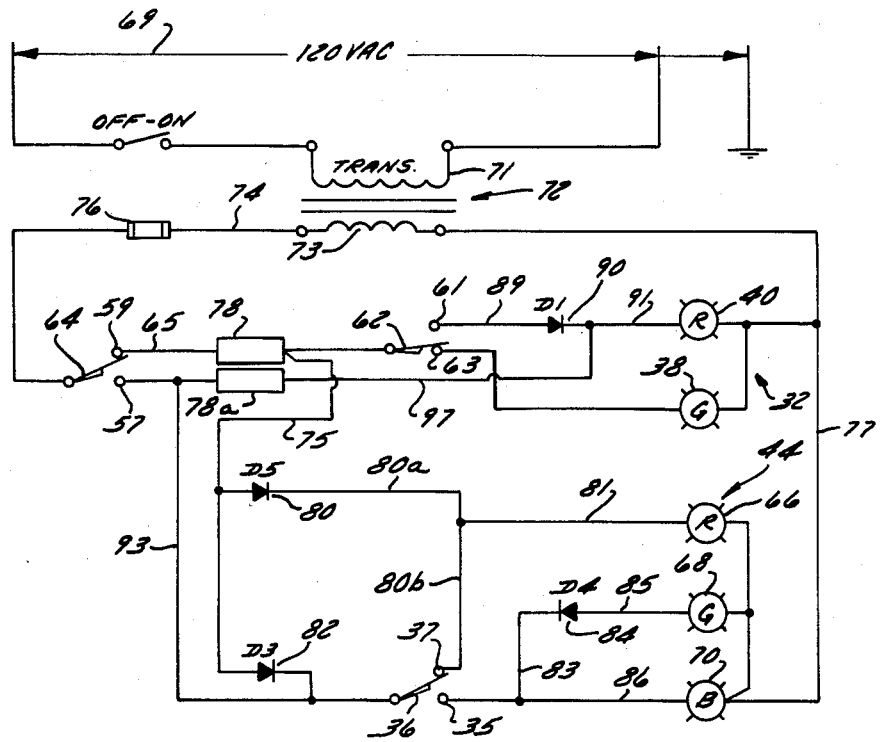
FIG. 5 is a circuit diagram for the inside and outside light assemblies.
Figure 4:
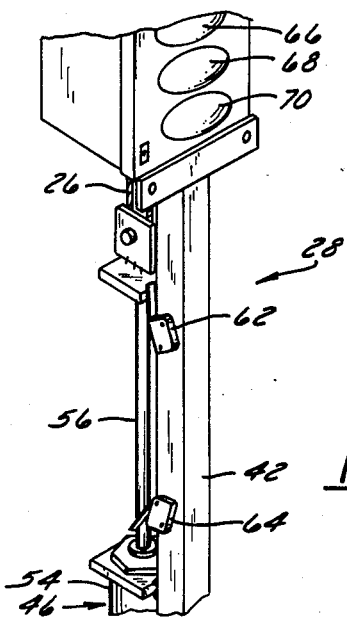
FIG. 4 is a view of the operating mechanism showing the inside light assembly.

Referring to FIG. 5, a circuit diagram is shown for the operation of the switches 36, 62 and 64, and the corresponding operation of the outside lights 38 and 40 and the inside lights 66, 68 and 70. As seen in the diagram, a transformer 72 is shown having a primary winding 71 and a secondary winding 73. The primary winding is connected across a 120-V AC power line 69. The secondary winding is connected by a line 74 through a fuse 76 to the limit switch 64 on one side and to the outside light assembly 32 and inside light assembly 44 on the other side by a line 77. The limit switch 64 in the normally closed position is connected by a line 65 through a flasher 78 to the limit switch 62. The limit switch 62 in the normally closed position is connected by a line 63 to the green light 38 in the outside light assembly 32. The outside green light 38 is, therefore, flashing when the switches 62 and 64 are in their normally closed position indicating to a truck driver that the truck can be moved.

The flasher 78 is also connected to the red light 66 in the inside light assembly 44 by a line 75 through diode 80 and lines 80a and 81 and through diode 82, line 93 switch 36 and lines 80b and 81. When the switches 62 and 64 are in their normal position, the red light 66 will also be flashing indicating to the operator that the ram 20 is not in the restraining or up position.

When a truck backs into the loading dock far enough to move the wand 34, the mercury switch 36 will move from contact 37 to contact 35. The blue light 70 will then be connected to flasher 78 through switch 36, contact 35 and line 86 and will also start flashing. The flashing blue light indicates to the dock operator that the truck is at the dock and the operator can actuate the piston 56 to raise the ram 20.

The operator then moves the handle 60 to the upper position to start the downward direction of the piston 56 into cylinder 54. The initial movement of the piston will move switch 62 from contact 63 into engagement with contact 61 opening the circuit to green light 38 and closing the circuit to flasher 78 through line 89, and diode 90 to start flashing the outside red light 40. The flashing red light indicating to the truck driver that the truck should not be moved.

When the piston reaches the end of the stroke, the ram 20 will be in the restraining position and the switch 64 will move from contact 59 to contact 57, opening the circuit to flasher 78 and closing the circuit to flasher 78a and to the outside red light 40 through lines 97 and 91. The outside red light 40 will continue to flash, indicating that the truck should not be moved. The circuit to the inside blue light 70 will be closed through line 93 switch 36 and line 86. The blue light 70 will be constant. This will also close the circuit to the green light 68 through line 93 switch 36, line 83, diode D-4, and line 85. The green light will be constant. The inside green light indicates to the forklift operator that the truck is restrained.

If the ram 20 is raised without an ICC bar activating the switch 36 on wand 34, switch 36 will remain in the normally closed position and the inside red light 66 will remain on through line 93, switch 36, and line 81. If the inside red light 66 is constant, the forklift operator should not enter the truck.

The embodiments of the invention in which an exclusive property or privilege is claimed, are defined as follows:

1. A driveway truck restraining apparatus positioned in front of a loading dock in a position to block the travel of an ICC bar located on the back of a truck, said apparatus comprising,
   a sealed casing embedded in a driveway in a spaced relation to a loading dock,
   a ram mounted in said casing for movement to a position to block the path of travel of the ICC bar located on the back of the truck,
   means for sensing the presence of the ICC bar on a truck, and
   means for moving said ram to the blocking position when the ICC bar is sensed by said sensing means to lock the truck at the loading dock, said moving means including:
   a cable secured to the lower end of said ram, and
   a pneumatic piston and cylinder assembly mounted on said dock and operatively connected to said cable for raising said ram to the blocking position.

2. The apparatus according to claim 1, wherein said sensing means includes
   a wand mounted on said casing,
   a mercury switch mounted on said wand, and
   an inside light assembly mounted on said dock and being operatively connected to said mercury switch to indicate the presence of the ICC bar on a truck at the loading dock.

3. The apparatus according to claim 1, including an inside light assembly mounted on said moving means and including a first light for indicating the presence of the ICC bar at the loading dock, a second light indicating that the ram has not been moved to the blocking position with respect to the ICC bar and a third light indicating that the ram has been moved to the blocking position with respect to the ICC bar whereby the truck is restrained at the loading dock.

4. A driveway truck restraint apparatus for blocking the path of travel of an ICC bar on a truck to prevent movement of the truck away from a loading dock,
   said apparatus comprising a sealed casing embedded in the ground in a spaced relation to a loading dock,
   means for sensing the ICC bar on a truck when the truck is moved to a position adjacent the dock,
   a ram mounted in said casing for movement from a storage position in said casing to an operative position projecting upwardly from said casing to block the path of motion of an ICC bar,
   means for moving said ram between storage position and said operative position,
   said moving means including a housing mounted on the inside wall of the loading dock and a pneumatic piston and cylinder assembly mounted in said housing and being operatively connected to said ram,
   means mounted on said housing and being operatively connected to said ICC bar sensing means for indicating the presence of a truck having an ICC bar at the loading lock,
   and means mounted on said housing for activating said piston and cylinder assembly to raise and lower said ram.

5. The apparatus according to claim 4
   including first sensing means in said housing for sensing the position of said piston and cylinder assembly when said ram is in the storage position and second sensing means sensing the position of the piston and cylinder assembly when said ram is in the operative position,
   first signal means mounted on said housing and being connected to said first sensing means for generating a visual signal when said ram is in the storage position,
   second signal means mounted on said housing and connected to said second sensing means for generating a visual signal when said ram is in the operative position.

6. The apparatus according to claim 5 wherein said indicating means comprises
   a wand type sensor mounted on said casing, and including a third signal means mounted on said housing and connected to said wand type sensor for generating a visual signal of the presence of a truck at the loading dock.

7. A driveway truck restraining apparatus for securing a truck in front of a loading dock, said apparatus comprising a sealed casing adapted to be buried partially in the ground,
  a ram mounted in said casing for movement between a storage position in said casing and an operative position projecting upward from said casing,
  an operating mechanism operatively connected to said ram, said mechanism including a pneumatic piston and cylinder assembly for moving said ram between the storage position and the operative position,
  a first limit switch for sensing the up position of the piston and a second limit switch for sensing the down position of the piston,
  a truck sensing means mounted on said casing for sensing the ICC bar on the truck,
  said truck sensing means including a coil spring having a mercury switch mounted thereon and a wand mounted on the spring for bending the spring when engaged by a truck to actuate said mercury switch,
  an outside light assembly including a red light and a green light,
  an inside light assembly including a red light, a green light and a blue light,
  and a circuit assembly operatively connecting the mercury switch and the first and second limit switches to the inside and outside light assemblies to generate visual signals of the presence of a truck at the loading dock and the position of the ram with respect to the truck.

* * * * *